United States Patent [19]
Olson et al.

[11] Patent Number: 4,627,572
[45] Date of Patent: Dec. 9, 1986

[54] MODULAR CENTRAL-PILLAR ASSEMBLIES FOR CENTER-PIVOT IRRIGATION APPARATUS

[76] Inventors: Theodore V. Olson, Box 758; Theodore D. Olson, Jr., R.R. 4, both of Atkinson, Nebr. 68713

[21] Appl. No.: 694,655

[22] Filed: Jan. 24, 1985

Related U.S. Application Data

[63] Continuation-in-part of Ser. No. 515,780, Jul. 21, 1983, abandoned.

[51] Int. Cl.⁴ .............................................. B05B 3/00
[52] U.S. Cl. .................................................. 239/728
[58] Field of Search ...................... 239/177.1, 709, 710, 239/711, 178

Primary Examiner—Jeffrey V. Nase
Assistant Examiner—Kevin Patrick Weldon
Attorney, Agent, or Firm—George R. Nimmer

[57] ABSTRACT

Disclosed are central-pillar assemblies wherein the various components are precision assembled at a factory location in a modular form for safe shipment to remote farmsteads and there easily reliably installed by relatively unskilled personnel. The assembly comprises an upwardly convergent tubular column serving both to structurally support and to supply water to an outflow-elbow portion for the irrigation apparatus, the tubular column being intersected by a water inlet-pipe and by a slanting oblique-pipe. There is a linear drive-conduit for the apparatus electrical commutation portion and taking a slanting posture wherein it is surrounded by and is in water impervious sealing relationship to the oblique-pipe and to the outflow-elbow. Housing for the electrical commutation is disposed below the oblique-pipe and is securely attached to the tubular column.

7 Claims, 6 Drawing Figures

U.S. Patent Dec. 9, 1986 Sheet 3 of 3 4,627,572
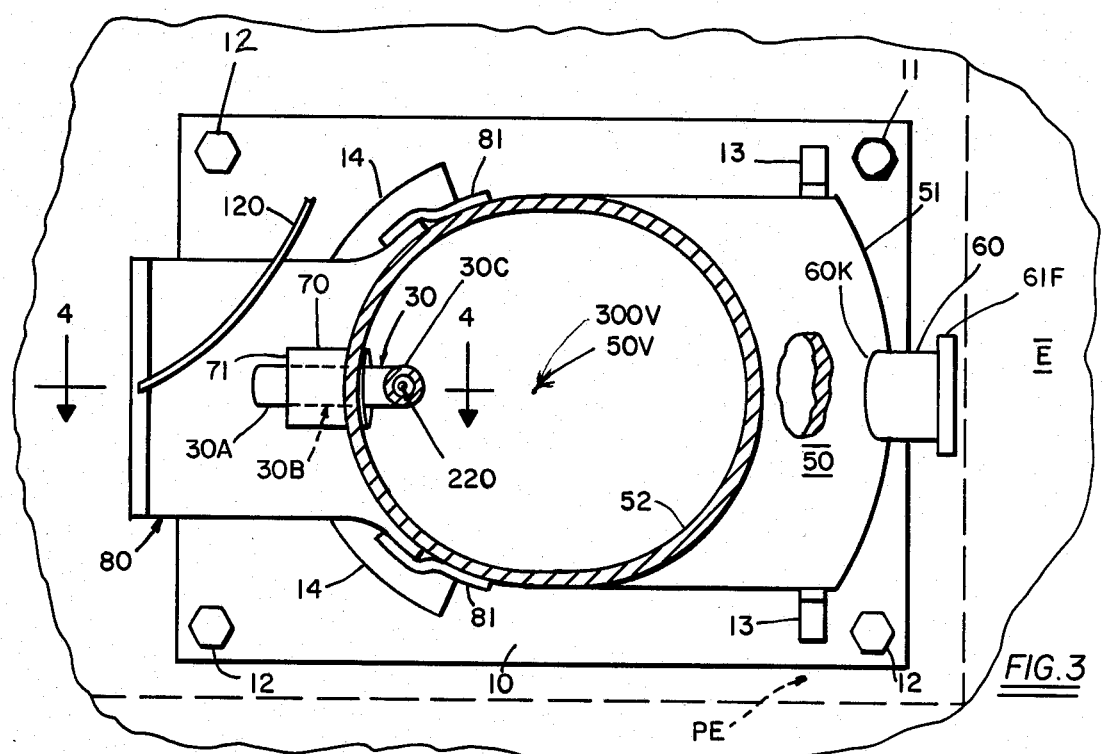
FIG. 3
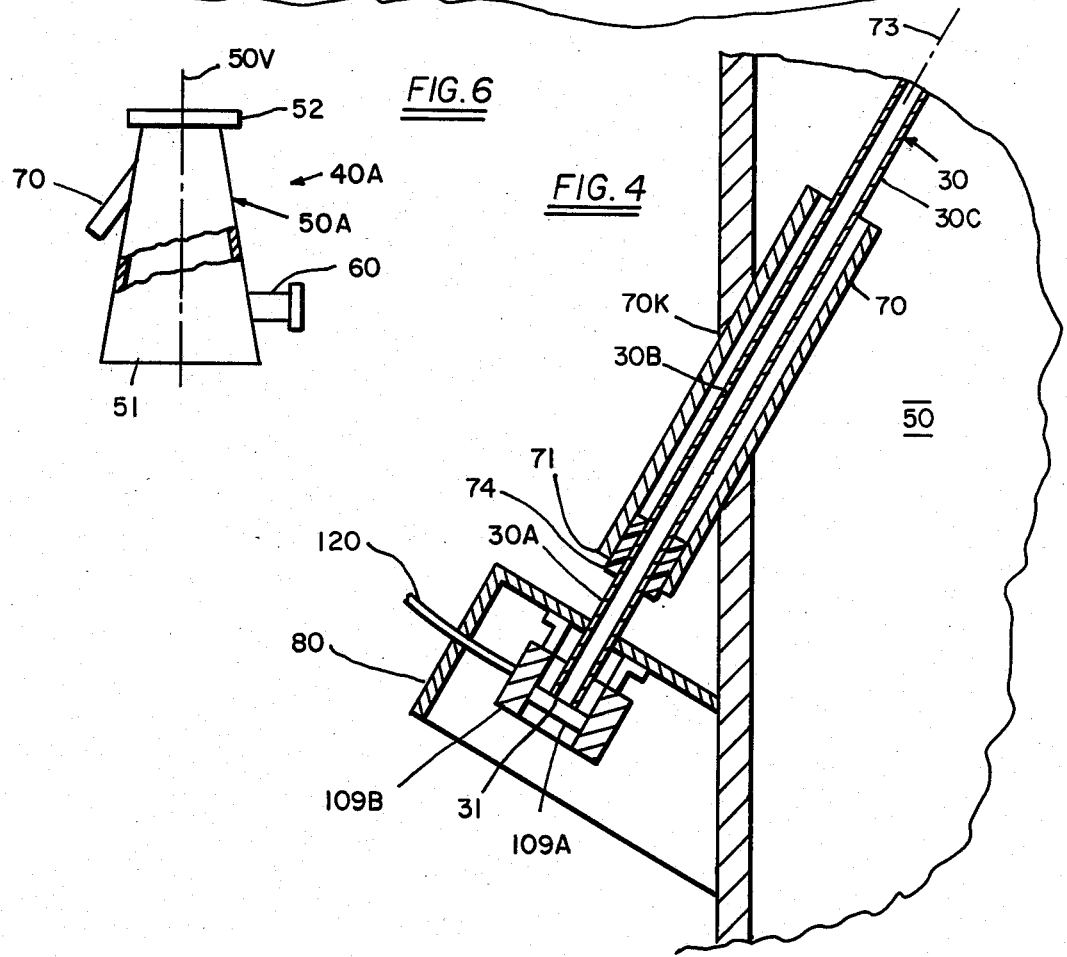
FIG. 6
FIG. 4

MODULAR CENTRAL-PILLAR ASSEMBLIES FOR CENTER-PIVOT IRRIGATION APPARATUS

PRIOR APPLICATION

This application is a continuation-in-part of co-pending application Ser. No. 06/515,780 (filed July 21, 1983) and entitled "Modular Central-Pillar Assemblies for Center-Pivot Irrigation Apparatus" now abandoned.

BACKGROUND OF THE INVENTION

Drawing FIG. 1 schematically depicts a typical prior art center-pivot sprinkler irrigation apparatus (200) including a lengthy water distributing conduit (210) having some elevation above the earth "E" and having water outlets (209). At the land tract "E" central site (300V) there is a central-pillar assembly 100 including water delivery means ultimately flowing into the conduit(210) inward-end 211. The water delivery means commences at inflow-pipe 100W and proceeds therefrom along medial-piping 202 to conduit inward-end 211. The typical water distributing conduit 210 extends radially outwardly from geographical vertical-reference 300V, there being underlying traction supports (S1, S2 ... S(N−1), SN) spaced therealong. Since the water inflow-pipe 100W usually emanates from terrain "E" below conduit 210, conduit inward-end 211 necessarily derives water from some outflow-elbow means (e.g. 105, 20) located loftily above terrain "E". Thus, as lengthy water distributing conduit 210 travels overland around its center-pivot (300V) inward-end 211, its far-end 218 circumscribes an irrigatable geometric shape 300S surrounding center-pivot 300V.

As schematically indicated in FIG. 1, electrical cable means (220) comprising a plurality of parallel electrical conductors might be periodically attached (at 225) and extend along the lengthy water distributing conduit 210 to control various functional components of the irrigation apparatus 200. For example, certain conductors (e.g. 221) might control the dual-directional drive motors DM for the respective traction wheels "W" including on-off and forward-reverse; other conductors (e.g. 222) might control the steering of steerable traction wheels "SW"; another conductor (e.g. 223) might control the actuation of end-gun 219; and other conductors (not shown) might control various other apparatus components. Inasmuch as the water distributing conduit 210 and the co-extensive electric cable means 220 rotate around center-axis 300V, there is necessarily an electrical commutation means (e.g. 109) positioned adjacent vertical center-axis 300V to prevent kinking or twisting of the cable means at its juncture with incoming power-line 120. The electrical commutation means has a non-rotatable brush holder portion 109B mounted upon an upright arm extension 108 from central-pillar bracing framework 107, and the commutation means armature portion 109A is physically attached to the cable means for co-rotation around vertical-axis 300V.

The medial-piping 102, surrounding vertical-axis 300V, proceeds upwardly from the water source (100W) coupling terminus 103 to the rotatably connected (101) outflow-elbow means 105. The medial-piping 102 is mounted in upright condition, as by said bracings 107 which are attached to earth-anchoring (e.g. concrete slab "PE"). Thus, such representative central-pillar assemblies 100 comprise various interdependent components which in the prior art require laborious assembling by skilled technicians at the central-pillar site 300V, namely: medial-piping 102, inflow-pipe coupling 103, rotatable coupling 101, outflow-elbow 105, bracing means 107, electrical commutation (109) and support therefor (e.g. 108), and commutation housing. A significant proportion of the working day of these highly-skilled required technicians is spent unproductively in traveling to the geographically remote and scattered farm sites where their expensive services are required. Economic savings would result if such high salaried technicians might spend their entire working day at a single factory type location in building the precision central-pillar assemblies in modular form suitable for transportation to the farm sites and there installed at the center-pivot site (300V) by relatively unskilled personnel. However, the prior art does not suggest a structural relationship of the central-pillar assembly into a precision built modular form that can be shipped from factory to farm site for field installation by relatively unskilled local personnel.

OBJECT OF THE INVENTION

It is accordingly the general objective of the present invention to provide a precision built, modular, and safely transportable form of the various components required for irrigation central-pillar assemblies whereby the assembly might be quickly and reliably installed at remote farm sites without requiring the assistance there of high salaried skilled technicians.

GENERAL DESCRIPTION OF THE INVENTION

With the aforestated general objective in view, and other objects and advantages which will become more apparent as this description proceeds, the modular central-pillar assemblies of the present invention generally comprises: for the assembly lower terminus, a horizontal plate (e.g. 10) or other base means attachable to suitable earth anchored environment (e.g. slab "PE"); the outflow-elbow means (e.g. 20, 105), and that is attachable to the irrigation piping (211) being maintained loftily above the base means by an upright tubular column (e.g. 50) having a vertical-axis (50V) colinear with the irrigation apparatus center-pivot (300V), and the outflow-elbow means being rotatable (101) about colinear axes 50V and 300V; a water inlet-pipe (e.g. 60) intersecting the tubular column whereby said column also serves as medialpiping between the environmental water inflow-pipe (e.g. 100W) and the outflow-elbow means; a tubular oblique-pipe (e.g. 70) as a branch-like intersection for the tubular column and having its branch-axis (73) intersecting said colinear axes (50V, 300V) above the tubular column; a linear drive-conduit (e.g. 30) extending along said slanting branch-axis (73) and having its medial portion (30B) surrounded by and in water impervious sealing engagement with the oblique-pipe, the drive-conduit upper portion (30C) intersecting and being in water impervious sealing engagement (e.g. 29, 93) with the outflow-elbow, and also being made (e.g. 29, 85) co-rotatable with the outflow-elbow; and the drive-conduit lower portion (30A) carrying the electrical commutation means armature portion (109A), and there being housing means (e.g. 80) attached to the tubular column and carrying the commutation brushes portion (109B).

BRIEF DESCRIPTION OF THE DRAWINGS

In the drawing, wherein like characters refer to like parts in the several views, and in which:

FIG. 3 is a sectional plan view taken along line 3—3 of FIG. 2;

FIG. 4 is a sectional detail view taken along line 4—4 of FIG. 3;

FIG. 6 is a side elevational view of an alternate embodiment (40A) for the hydrant tubular column portion.

DETAILED DESCRIPTION OF THE DRAWING

Figure 1:
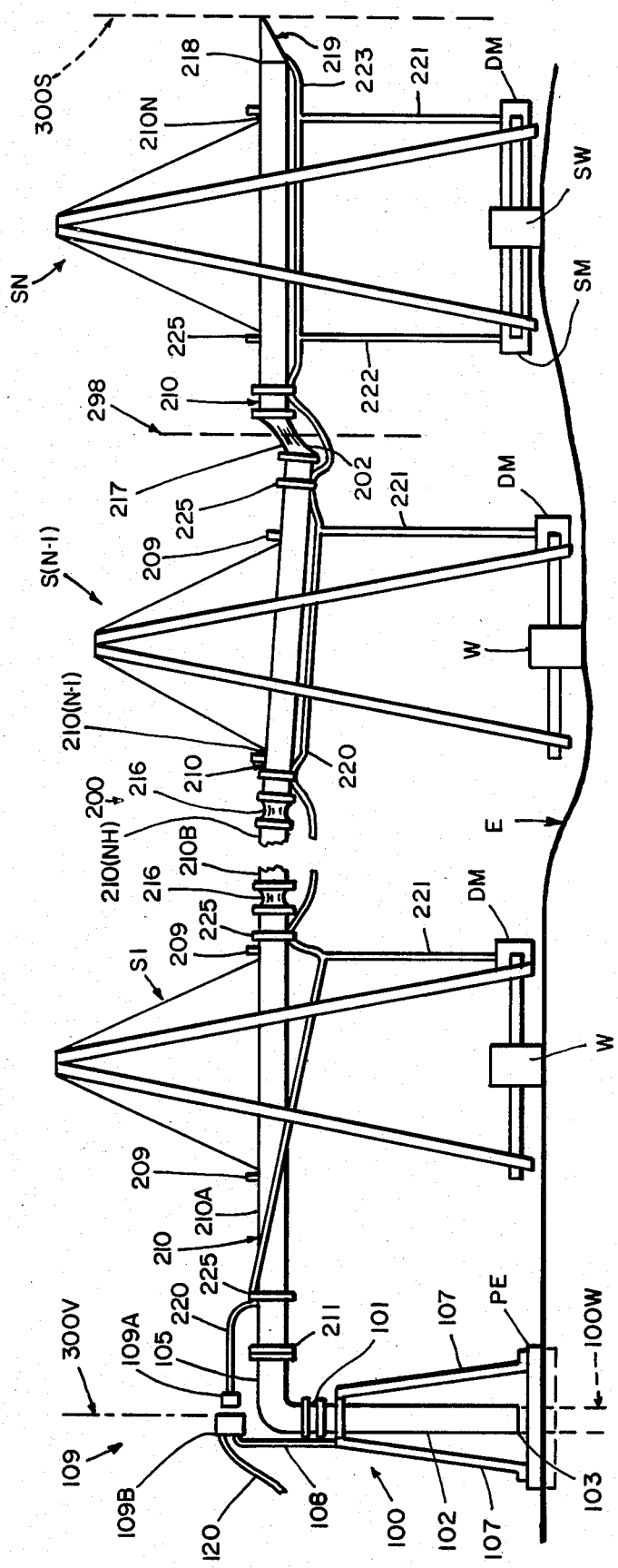
FIG. 1 is a side elevational schematic view of a typical prior art center-pivot type overland sprinkler irrigation apparatus and including a prior art central-pillar assembly therefor.

Turning now to drawing FIGS. 2-5 which depict representative embodiment "MCA" of the modular central-pillar assembly concept of the present invention.

For an underlying base means, there is provided a rectangular metallic horizontal plate 10 adapted to be flatly superimposed upon an earth anchored concrete footing environment "PE". The plate 10 desireably includes apertures 11 whereby studs 12, or the like, might be employed to attach base plate 10 to concrete footing "PE".

There is a hydrant 40 comprising three intersecting and attached tubular components including upright tubular column 50, water inlet-pipe 60, and oblique-pipe 70. Tubular column 50 surrounds a vertical columnar-axis 50V that is superimposable along center-pivot vertical-axis 300V, and has annular lower-end 51 and annular upper-end 52 respectively surrounding colinear axes 50V and 300V. Upright tubular column 50 is of upwardly convergent shape so as to serve both a the medial-piping between the water source (e.g. 100W) and the outflow-elbow means (e.g. 20, 105) and also to wholly structurally maintain the lofty position of the outflow-elbow means. The tubular column is of such upwardly convergent shape that its annular lower-end 51 is circumferentially at least about twice that of its annular upper-end 52. Upwardly convergent columns 50 and 50A have circularly annular upper-ends (52) which are horizontally flanged (52F). The horizontal lower-end 51 has a water impervious relationship with base plate 10 as, for example, by welding the metallic components 10 and 50. Gusset plate 13 and 14, having elevations at or below inlet-pipe 60, might be welded to base plate 10 and to the lower portion (51) of the tubular column (50, 50A). Horizontal water inlet-pipe 60 intersects and communicates with the interior of the tubular column and is attached thereto as by welding or other water impervious connection. Inlet-pipe 60 is flanged (61F) to permit ready connection to a suitable water inflow-pipe (e.g. 100W).

Completing hydrant 40 is a linear tubular oblique-pipe (70) providing for the tubular column a depending tubular branch having its intersection (70K) located nearer to column upper-end 52 than to lower-end 51. Similarly as with inlet-pipe 60 at 60K, the communicating oblique-pipe 70 is attached (as by welding or other water impervious means) to tubular column 50. Slanting oblique-pipe 70, having a bottom-end 71 located above column lower-end 51, circularly surrounds linear branch-axis 73 that intersects columnar-axis 50V above column upper-end 52 at an angular value Y°. Preferably, the intersection-point (P) of axes 73 and 50V is located substantially at or immediately below the outflow-elbow means roof (23), and angular value Y° is less than 30° and preferably less than 20°.

Figure 2:
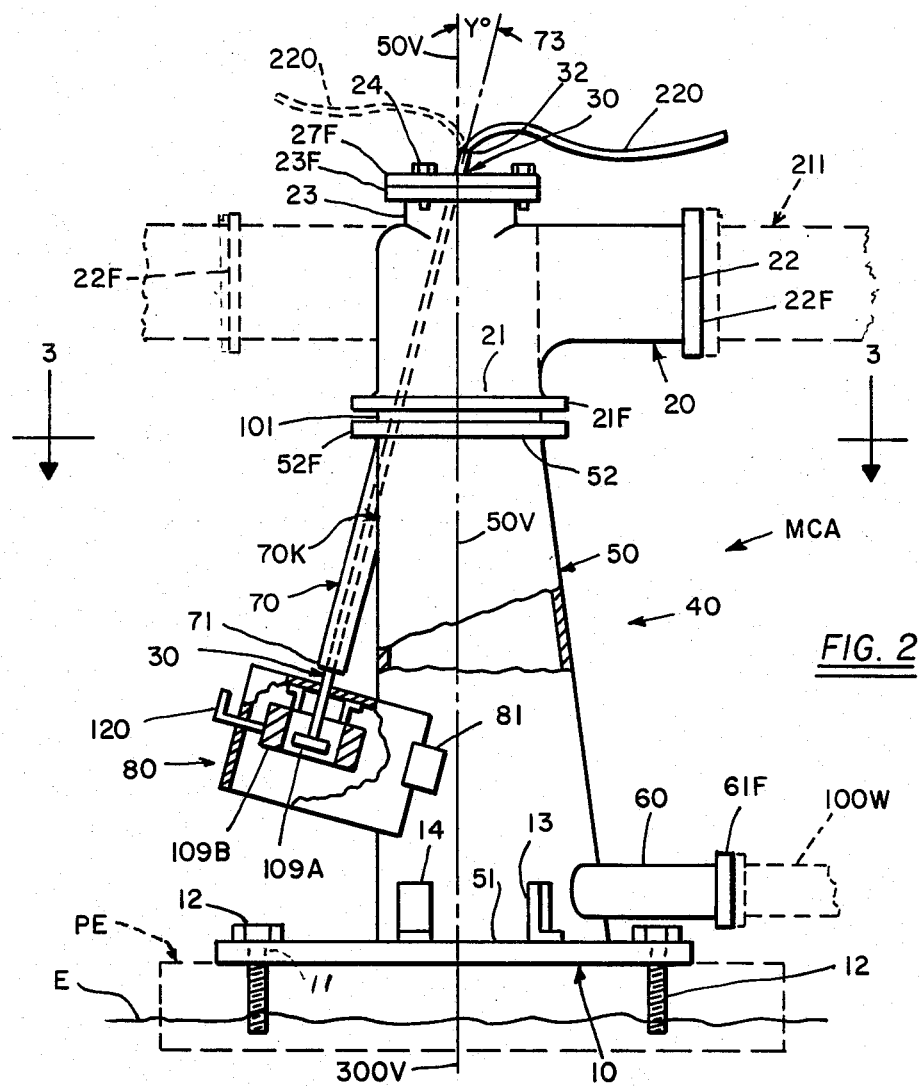
FIG. 2 is a side elevational view of a representative embodiment of the modular central-pillar assembly of the present invention.
Figure 5:
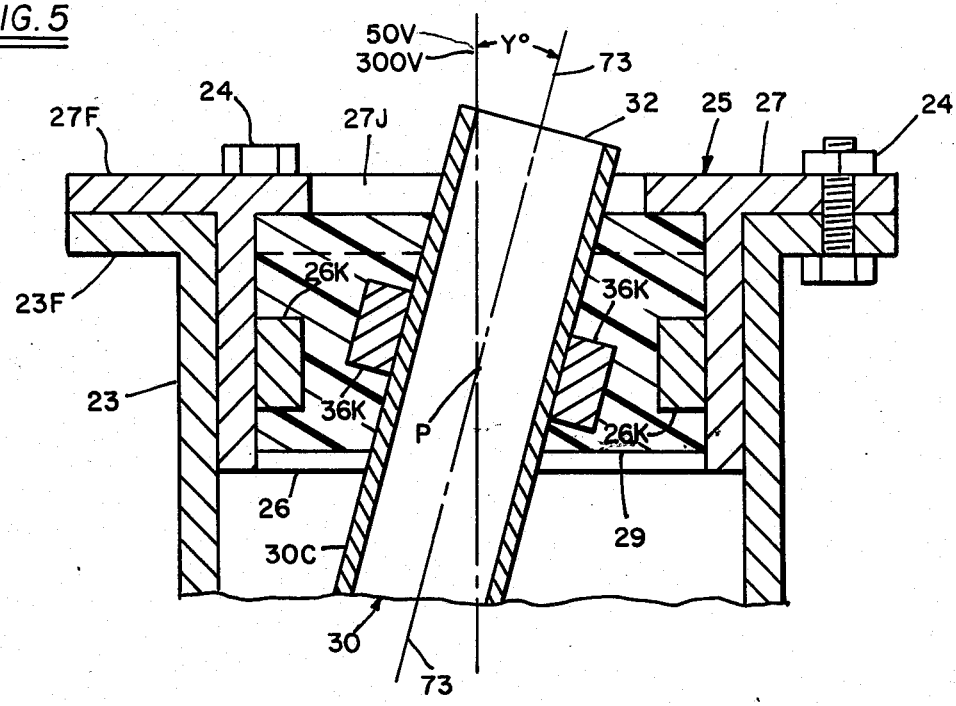
FIG. 5 is a sectional detail view at the upper portion of the FIG. 2 representative embodiment "MCA"

Similarly as in the prior art, the outflow-elbow means (e.g. 20, 105) horizontal annular inlet-end 21 is flanged (21F) to facilitate a rotational connection with the flanged (52F) upper-end of the tubular column. Intervening between and connected to the flanged inlet-end 21 and the flanged upper-end 52 is a rotatable joint (e.g. 101) whereby the outflow-elbow means is rotatable about colinear axes 50V and 300V as indicated in FIG. 2 phantom line. The outflow-elbow means upright outlet-end 22 is shown as flanged (22F) for conventional connection to the elongate irrigation conduit inward-end 211.

A linear tubular drive-conduit 30, preferably of circular cross-sectional shape, surrounds lineal branch-axis 73 and the outgoing electrical powerline 220. Drive-conduit 30 has an upper lead-end 32 and a lower trail-end 31 which carries the commutation means armature portion 109A. Between its terminii 31 and 32, the drive-conduit 30 has three length portions including: lower length 30A extending below oblique-pipe bottom-end 71 and terminating at armature 109A; medial length portion 30B surrounded by oblique-pipe 70; and upper length portion 30C surrounded by outflow-elbow 20 and terminating at lead-end 32 located above the outflow-elbow. Medial length 30B is in water impervious sealing relationship with oblique-pipe 70 at bottom-end 71, as by resinous material 74, to prevent hydrant water leakage through the oblique-pipe. Similarly, upper length portion 30C below lead-end 32 is in sealing relationship with the outflow-elbow, as by a water impervious resinous material 29.

It can be appreciated that the torsional force for causing drive-conduit 30 to twist about branch-axis 73 is derived from rotation of the outflow-elbow (20) around vertical-axis 300V. In order to ensure that drive-conduit 30 will co-rotate with outflow-elbow 20, and consistent with the prevention of water leakage along the drive-conduit 30, an adapter means (e.g. 25) is preferably employed. Adapter member 25 comprises a tubular shell 26 surrounding axis 50V and including a plurality of attached ribs 26K radiating inwardly toward axis 50V. Tubular shell 26 also includes an apertured (27J) head 27 terminating as head-flange 27F. Drive-conduit upper length 30C, which is surrounded by a metallic ribbed tubular shell 26, includes a plurality of attached metallic webs 36K extending toward metallic ribs 26K. A flexibly resilient resinous material 29 intervenes between and sealably joins the webbed (36K) drive-conduit 30 to the ribbed (26K) tubular shell 26 to complete adapter member 25. Adapter member 25 is then installed into the assembly by the following steps: feeding the drive-conduit lengths 30A and 30B downwardly through outflow-elbow projection 23 and oblique-pipe 70; applying resinous sealant 74 and armature 109A; and finally joining adapter flange 27F to projection flange 23F with conventional mechanical fasteners 24.

For the flexibly resilient resinous material 29, polyurethane elastomers having the following usual properties therefor are preferred:

a tensile strength of 3,000 to 5,000 p.s.i.;
excellent adhesion to metals;
excellent tear resistance; and
good compression set.

Polyurethane resinous materials having these properties are selectable from shelf items readily; available from conventional sources.

Such resinous material properties ensure that the rotation of adapter 25 about colinear axes 50V and 300V will initiate a co-rotational twisting of oblique-pipe 70 about its branch-axis 73 and appropriate accompanied by a non-tearing resilient flexing of resinous material 29. For the oblique-pipe resinous sealant 74, a like polyurethane elastomer might be employed.

Brushes-holder 80, which is attached (e.g. with straps 81) to the tubular column (50, 50A) below oblique-pipe 70, supports incoming powerline 120 and the commutation means brushes component (109B), the said brushes surrounding the rotational armature (109A) in conventional fashion.

The alternative hydrant embodiment 40A of FIG. 6 has a tubular column 50A differing from column 50 in that for column 50A its entire extent (51–52) circularly concentrically surrounds columnar-axis 50V.

In the primary embodiment "MCA" of FIGS. 2-5 an adapter means is utilized to provide water sealing and co-rotational engagements between the drive-conduit upper length portion (30C) and the upper part (23) of the outflow-elbow means. As already described, for embodiment "MCA", the adapter means (25) takes the form of flexibly resilient resinous filler material (29) joining the webbed (36K) drive-conduit to the ribbed (26K) tubular shell.

Thus, it can be seen that the resultant central-pillar assemblies function as required for center-pivot type irrigation. Moreover, they are of a precision modular type structure suitable for factory shipment to a distant irrigation site and there readily and reliably installed by relatively unskilled personnel.

From the foregoing, the construction, installation, and operation of the modular central-pillar assemblies will be readily understood and further explanation is believed to be unnecessary. However, since numerous modifications and changes will readily occur to those skilled in the art, it is not desired to limit the scope of the invention to the exact constructions shown and described, and accordingly, all further modifications and equivalents may be resorted to, as falling within the scope of the appended claims.

We claim:

1. For a self-propelled sprinkler irrigation apparatus of the type comprising a lenghty water distributing conduit elevated above the earth's surface and adapted to rotate as an axis around a vertical-axis center-pivot site, said site including an earth anchored member and a water inflow-pipe leading toward the vertical-axis, a modular portable central-pillar assembly providing the water flow connection between said inflow-pipe and the water distributing conduit thereabove, said modular central-pivot assembly comprising:

A. base means providing the lower terminus of the assembly and being attachable to the earth anchorable member;

B. outflow-elbow means located loftily above said base means, said outflow-elbow means having a generally horizontal lower inlet-end surrounding said vertical-axis and an outlet-end thereabove that is attachable to the lengthy water distributing conduit;

C. an upright tubular column surrounding a columnar-axis superimposable along said vertical-axis, said upright tubular column having an annular lower-end and an annular upper-end both surrounding said columnar-axis, said outflow-elbow means inlet-end surrounding the columnar-axis and being rotatably secured to the column upper-end whereby the outflow-elbow means is rotatable about the colinear vertical-axis and columnar-axis, said column lower-end being attached in fluid sealed relationship to the base means, said tubular column converging from lower-end to upper-end and providing sufficient columnar strength to maintain the laden outflow-elbow means elevated loftily above the base means and the earth anchorable member;

D. a water inlet-pipe intersecting the tubular column and adapted to be attached to said inflow-pipe;

E. a tubular oblique-pipe angularly depending as a branch from the tubular column and communicating therewith nearer to the upper-end than to the lower-end, said oblique-pipe throughout surrounding a linear branch-axis that intersects the columnar-axis at an intersection-point located above the inlet-end of the outflow-elbow means;

F. a linear drive-conduit surrounding said linear branch-axis and having a medial length portion surrounded by and being in water sealing engagement with the oblique-pipe, the drive-conduit having an upper length portion in water sealing engagement relationship with the outflow-elbow means loftily above the lower inlet-end and being in co-rotatable engagement with the outflow-elbow means, and the drive-conduit having a lower length portion located below the oblique-pipe and carrying an armature portion of the electrical commutation means; and G. a brushes-holder in electrical commutation relationship with said armature portion, said brushes-holder being attached to the tubular-column member of said central-pillar assembly.

2. The modular central-pillar assembly of claim 1 wherein the outflow-elbow means outlet-end occupies an upright plane; wherein the tubular column at the annular upper-end is of circular cross-sectional shape; and wherein the drive-conduit is of circular cross-sectional shape.

3. The central-pillar assembly of claim 2 wherein the perimeter of the tubular column at the lower-end bears a ratio of at least three as compared to the perimeter at said circular upper-end; wherein the angularly intersecting relationship between the columnar-axis and the branch-axis is less than 30°; and wherein the oblique-pipe is of circular cross-sectional shape.

4. The central-pillar assembly of claim 3 wherein the circular oblique-pipe and the circular drive-conduit are concentric about said branch-axis; and wherein the base means takes the form of a horizontal base-plate including apertures therethrough to accommodate vertical studs for engagement with the earth anchoring means, said horizontal base-plate being braceably attached to the tubular column with gussets located at the column lower-end.

5. The central-pillar assembly of claim 3 wherein said ratio is at least four and said angular relationship is less than 20°; and wherein flexible resinous material is employed for said sealing engagements of the drive-conduit with the oblique-pipe and with respect to the outflow-elbow means.

6. The modular central-pillar assembly of claim 1 wherein the outflow-elbow means includes an upwardly extending annular projection surrounding the drive-conduit upper length portion; and wherein an adapter is attached to and is surrounded by the outflow-elbow means upwardly extending annular projection, said adapter surrounding the drive-conduit upper length portion, there being both water sealing and co-rotational means extending from the adapter toward the drive-conduit upper length portion.

7. The assembly of claim 6 wherein the drive-conduit upper length portion is provided with a plurality of outwardly extending webs; and wherein the adapter is provided with a plurality of ribs extending inwardly toward the drive-conduit upper length portion, and there being resiliently flexible resinous material joining the webbed drive-conduit to the ribbed adapter, said resinous material providing both said water sealing means and said co-rotational engagement means.

* * * * *